US012297926B2

(12) United States Patent
Agarwal et al.

(10) Patent No.: US 12,297,926 B2
(45) Date of Patent: May 13, 2025

(54) SOLENOID OPERATED PRESSURE CARTRIDGE FOR INFLATION SYSTEM

(71) Applicant: Goodrich Corporation, Charlotte, NC (US)

(72) Inventors: Ashish Kumar Agarwal, Bangalore (IN); Poly John, Cochin (IN)

(73) Assignee: GOODRICH CORPORATION, Charlotte, NC (US)

( * ) Notice: Subject to any disclaimer, the term of this patent is extended or adjusted under 35 U.S.C. 154(b) by 69 days.

(21) Appl. No.: 17/899,290

(22) Filed: Aug. 30, 2022

(65) Prior Publication Data
US 2023/0375104 A1 Nov. 23, 2023

(30) Foreign Application Priority Data

May 20, 2022 (IN) ............................. 202241029167

(51) Int. Cl.
F16K 31/06 (2006.01)
F16K 31/124 (2006.01)
(Continued)

(52) U.S. Cl.
CPC ........ F16K 31/0651 (2013.01); F16K 31/124 (2013.01); F16K 31/163 (2013.01); B64D 25/14 (2013.01)

(58) Field of Classification Search
CPC .......... F16K 31/42; F16K 24/06; F16K 31/58; B64D 25/14; B63C 9/24; F17C 2270/0772
See application file for complete search history.

(56) References Cited

U.S. PATENT DOCUMENTS 9,601,222 B2 * 3/2017 Roit .......................... G21D 1/02
10,612,677 B2 4/2020 John et al.
(Continued)

FOREIGN PATENT DOCUMENTS

CN 113483252 A * 10/2021
EP 3360772 8/2018

OTHER PUBLICATIONS

English translation of CN 113483252 (Year: 2021).*
(Continued)

Primary Examiner — Umashankar Venkatesan
(74) Attorney, Agent, or Firm — SNELL & WILMER L.L.P.

(57) ABSTRACT

An inflation valve arrangement includes an actuation cavity housing connected to a pneumatic valve, the actuation cavity housing comprising an actuation cavity and a piston rod extending from the actuation cavity at least partially into a main fluid channel of the pneumatic valve in an initially extended position for securing the pneumatic valve in a closed position. The arrangement further comprises a solenoid actuated pressure cartridge connected to the actuation cavity housing. The solenoid actuated pressure cartridge comprises a self-contained source of actuation gas. In response to the solenoid actuated pressure cartridge being energized, the solenoid operated pressure cartridge is configured to release the actuation gas from the pressure cavity into the actuation cavity, thereby retracting the piston rod into the actuation cavity, and opening the pneumatic valve body to release a source of inflation gas to an inflation device.

20 Claims, 7 Drawing Sheets

(51) Int. Cl.
  *F16K 31/163*  (2006.01)
  *B64D 25/14*   (2006.01)

(56) References Cited

U.S. PATENT DOCUMENTS

| | | |
|---|---|---|
| 10,612,723 B2 | 4/2020 | John et al. |
| 11,119,516 B2 | 9/2021 | Nagaraj et al. |
| 11,169,552 B2 | 11/2021 | John et al. |
| 2019/0353263 A1 | 11/2019 | John |
| 2020/0096123 A1 | 3/2020 | Czechowski |
| 2020/0326014 A1 | 10/2020 | John et al. |

OTHER PUBLICATIONS

European Patent Office, European Search Report dated Sep. 22, 2023 in Application No. 23172562.3.
European Patent Office, European Office Action dated Aug. 28, 2024 in Application No. 23172562.3.

* cited by examiner

SOLENOID OPERATED PRESSURE CARTRIDGE FOR INFLATION SYSTEM

CROSS-REFERENCE TO RELATED APPLICATIONS

This application claims priority to, and the benefit of, India Provisional Patent Application No. 202241029167, filed May 20, 2022 (DAS Code 03BE) and titled "SOLENOID OPERATED PRESSURE CARTRIDGE FOR INFLATION SYSTEM," which is incorporated by reference herein in its entirety for all purposes.

FIELD

The present disclosure relates generally to inflatable fluid sources and, more particularly, to a valve arrangement for a pressurized fluid source for an inflatable device.

BACKGROUND

Inflatable evacuation systems may be found on various structures, including aircraft, boats, offshore drilling platforms and the like. The systems are typically equipped with an inflatable or an inflatable device, such as, for example, an inflatable slide or an inflatable raft, configured to facilitate rapid evacuation of persons in the event of an emergency. Such inflatables are typically stored in an uninflated condition on the structure in a location readily accessible for deployment. For example, an evacuation slide for a commercial aircraft is stored in an uninflated condition in a case or compartment located proximate an emergency exit.

Systems used to inflate evacuation slides typically employ a gas stored within a cylinder or tank at high pressure, which is discharged into the evacuation slide (or into an inflatable tube comprised within the evacuation slide) within a specific time period. This may be accomplished, for example, by opening a main inflation valve that connects the high-pressure gas to the inflatable tube.

SUMMARY

A valve arrangement for a pressurized fluid source is disclosed, in accordance with various embodiments. The valve arrangement comprises a valve body comprising a first inlet, a first outlet, and a main fluid channel extending along a longitudinal axis of the valve body. The valve arrangement further comprises a spool located in the main fluid channel, the spool configured to translate along the longitudinal axis of the valve body. The valve arrangement further comprises an actuation cavity housing configured to be coupled to the valve body, the actuation cavity housing comprising a second inlet, a piston aperture, and an actuation cavity. The valve arrangement further comprises a piston rod located at least partially within the actuation cavity, the piston rod configured to extend from the actuation cavity housing at least partially into the main fluid channel to secure the spool in a first position whereby the spool fluidly seals the first inlet from the first outlet. The valve arrangement further comprises a solenoid operated pressure cartridge configured to be coupled to the actuation cavity housing, wherein, in response to the solenoid operated pressure cartridge being energized, the solenoid operated pressure cartridge is configured to release an actuation fluid pressure into the actuation cavity to bias the piston rod to exit the main fluid channel, thereby releasing the spool from the first position to a second position whereby the first inlet is in fluid communication with the first outlet.

In various embodiments, in the first position, an inflation fluid pressure from the first inlet biases the spool to abut the piston rod.

In various embodiments, the piston rod is configured to translate along a longitudinal axis of the actuation cavity housing, wherein the longitudinal axis of the valve body is oriented at a non-parallel angle with respect to the longitudinal axis of the actuation cavity housing.

In various embodiments, the solenoid operated pressure cartridge comprises a pressure cavity containing the actuation fluid pressure.

In various embodiments, the solenoid operated pressure cartridge further comprises a valve seat, a plunger fluidly communicative with the pressure cavity and initially in a closed position relative to the valve seat, and an electromagnet configured to generate a magnetic flux to move the plunger into an open position relative to the valve seat.

In various embodiments, the solenoid operated pressure cartridge further comprises a spring configured to bias the plunger toward the closed position.

In various embodiments, the solenoid operated pressure cartridge further comprises a pressure sensor in fluid communication with the pressure cavity.

In various embodiments, the solenoid operated pressure cartridge further comprises a fill valve whereby the pressure cavity is configured to receive a pressurized fluid from an external fluid source.

In various embodiments, the piston rod comprises a piston head attached thereto, the piston head disposed in the actuation cavity.

In various embodiments, the valve arrangement further comprises a vent fluidly connected to the actuation cavity housing, the vent including a vent body having one or more vent holes formed therein and an elastomeric sleeve surrounding a portion of the vent body and covering the one or more vent holes.

A solenoid operated pressure cartridge is disclosed, in accordance with various embodiments. The solenoid operated pressure cartridge comprises a pressure cartridge body defining a pressure cavity and an inlet, a fill valve disposed at the inlet whereby the pressure cavity is configured to receive a pressurized fluid, a valve seat, a plunger fluidly communicative with the pressure cavity and initially in a closed position relative to the valve seat, and an electromagnet configured to generate a magnetic flux to move the plunger into an open position relative to the valve seat. In response to the plunger moving into the open position relative to the valve seat, the solenoid operated pressure cartridge is configured to release the pressurized fluid from the pressure cavity.

In various embodiments, the plunger comprises a flange extending outwardly therefrom.

In various embodiments, the solenoid operated pressure cartridge further comprises a second pressure cavity, wherein the flange is longitudinally aligned between the electromagnet and the second pressure cavity.

In various embodiments, the solenoid operated pressure cartridge further comprises an air gap located longitudinally between the flange and the electromagnet.

In various embodiments, the solenoid operated pressure cartridge further comprises a spring configured to bias the plunger toward the closed position.

In various embodiments, the flange is located longitudinally between the first pressure cavity and the second pressure cavity.

An inflation valve arrangement for inflating an inflatable device is disclosed, in accordance with various embodiments. The inflation valve arrangement comprises a pneumatic valve body comprising a main fluid channel having a valve body inlet connected to a source of inflation gas and valve body outlet connected to the inflatable device. The inflation valve arrangement further comprises a spool located in the main fluid channel, the spool configured to translate along a longitudinal axis of the pneumatic valve body. The inflation valve arrangement further comprises an actuation cavity housing connected to the pneumatic valve body, the actuation cavity housing comprising an actuation cavity. The inflation valve arrangement further comprises a piston rod extending from the actuation cavity at least partially into the main fluid channel in an initially extended position. The inflation valve arrangement further comprises a solenoid actuated pressure cartridge connected to the actuation cavity housing. The solenoid actuated pressure cartridge comprises a pressure cavity containing a source of actuation gas, a valve seat, a plunger fluidly communicative with the pressure cavity and initially in a closed position relative to the valve seat, and an electromagnet configured to generate a magnetic flux to move the plunger into an open position relative to the valve seat. In response to the plunger moving into the open position relative to the valve seat, the solenoid operated pressure cartridge is configured to release the actuation gas from the pressure cavity into the actuation cavity.

In various embodiments, in response to the actuation cavity receiving the actuation gas, the piston rod is configured to move from the initially extended position to a retracted position.

In various embodiments, in response to the piston rod moving from the initially extended position to the retracted position, the inflation gas is configured to move the spool from a first position, whereby the spool fluidly seals the valve body inlet from the valve body outlet, to a second position, whereby the valve body inlet is fluidly coupled to the valve body outlet, thereby releasing the inflation gas into the inflatable device.

In various embodiments, the solenoid actuated pressure cartridge further comprises a second inlet and a fill valve disposed at the second inlet whereby the pressure cavity is configured to be pressurized with the actuation gas.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
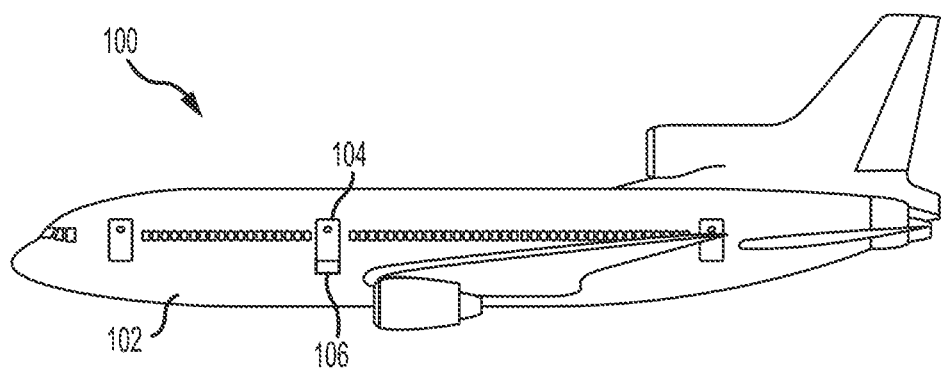
FIG. 1 illustrates an aircraft having an evacuation assembly, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation assemblies. However, various aspects of the disclosed systems and methods may be adapted for performance in a variety of other inflatable assemblies, for example, inflatable raft assemblies, and/or any other assemblies having charged cylinders. As such, numerous applications of the present disclosure may be realized.

Inflation valve arrangements of the present disclosure include a solenoid operated pressure cartridge which may be installed at a mechanical interface of the valve arrangement in a retrofit manner. The solenoid operated pressure cartridge comprises a self-contained pressure cavity, eliminating any desire to source fluid pressure from another fluid source (e.g., a gas bottle). A wireless pressure sensor may monitor the fluid pressure of the solenoid operated pressure cartridge to ensure to maintain the in-service operable conditions of the pressure cartridge. Solenoids can be used repeatedly and therefore a solenoid operated pressure cartridge of the present disclosure possess built in test features, increasing the reliability and cost-effectiveness of the device. A solenoid operated pressure cartridge of the present disclosure may include a high pressure, fast acting and leak tight solenoid valve. Nominal operating pressures of a solenoid operated pressure cartridge of the present disclosure may be much smaller than the associated gas bottle pressure. In this manner, the solenoid design may be optimized further to reduce in size compared to other solenoid designs that operate at the associated gas bottle pressure. A solenoid operated pressure cartridge of the present disclosure may be energized with a relatively low voltage input, such as a 28 VDC signal.

Referring now to FIG. 1, an aircraft 100 is shown. Aircraft 100 may include a fuselage 102 having plurality of exit doors, including exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member, such as the depression of a button, the actuation of a lever, or the like.

Figure 2:
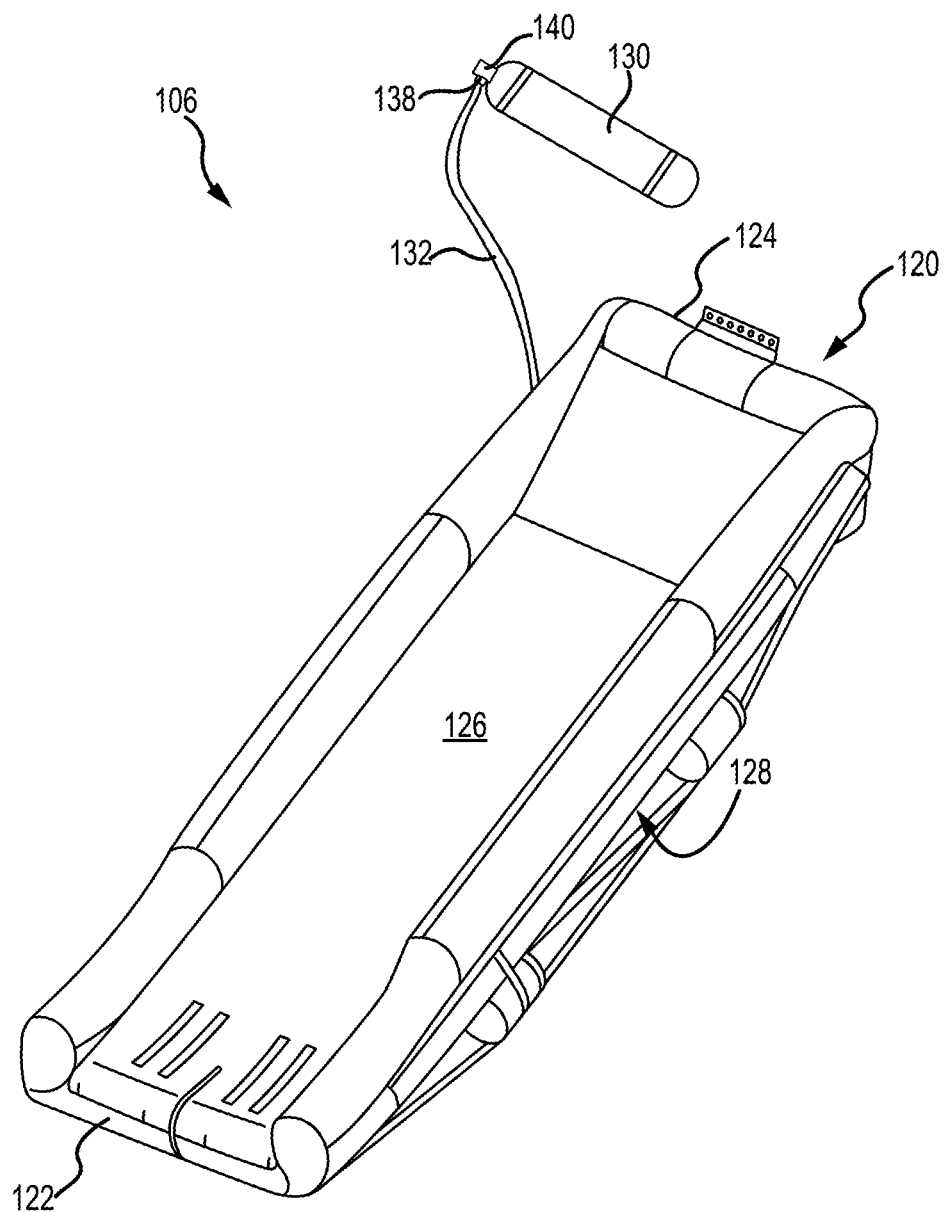
FIG. 2 illustrates an evacuation assembly with the evacuation slide in a deployed position, in accordance with various embodiments.

With reference to FIG. 2, additional details of evacuation assembly 106 are illustrated. In accordance with various embodiments, evacuation assembly 106 includes an evacuation slide 120 and a pressurized fluid source 130. In accordance with various embodiments, evacuation slide 120 includes a toe end 122 and a head end 124 opposite toe end 122. Head end 124 may be coupled to an aircraft structure (e.g., fuselage 102 in FIG. 1). In accordance with various embodiments, evacuation slide 120 is an inflatable slide. Evacuation slide 120 includes a sliding surface 126 and an underside surface 128 opposite sliding surface 126. Sliding surface 126 extends from head end 124 to toe end 122. During an evacuation event, underside surface 128 may be oriented toward an exit surface (e.g., toward the ground or toward a body of water). Evacuation slide 120 is illustrated as a single lane slide; however, evacuation slide 120 may comprise any number of lanes.

Evacuation assembly 106 includes pressurized fluid source 130 (also referred to as a charge cylinder). Pressurized fluid source 130 is configured to deliver a pressurized fluid, such as pressurized gas (also referred to herein as an inflation gas), to inflate evacuation slide 120. Pressurized fluid source 130 is fluidly coupled to evacuation slide 120. For example, pressurized fluid source 130 may be fluidly coupled to evacuation slide 120 via a hose, or conduit, 132. In response to receiving pressurized fluid from pressurized fluid source 130, evacuation slide 120 begins to inflate.

In accordance with various embodiments, conduit 132 may be connected to a valve outlet 138 of a valve assembly 140 (also referred to herein as a pressure regulator shutoff valve or a solenoid operated pressure regulator cum shut off valve) fluidly coupled to pressurized fluid source 130. In this regard, valve assembly 140 is fluidly coupled between pressurized fluid source 130 and conduit 132. As described in further detail below valve assembly 140 is configured to regulate the flow of pressurized fluid from pressurized fluid source 130 to evacuation slide 120. In this regard, when evacuation slide 120 is in a stowed (or deflated) state, valve assembly 140 is in a closed position. In response to deployment of evacuation assembly 106, valve assembly 140 translates to an open position, thereby allowing fluid to flow from pressurized fluid source 130 to evacuation slide 120.

Figure 3A:
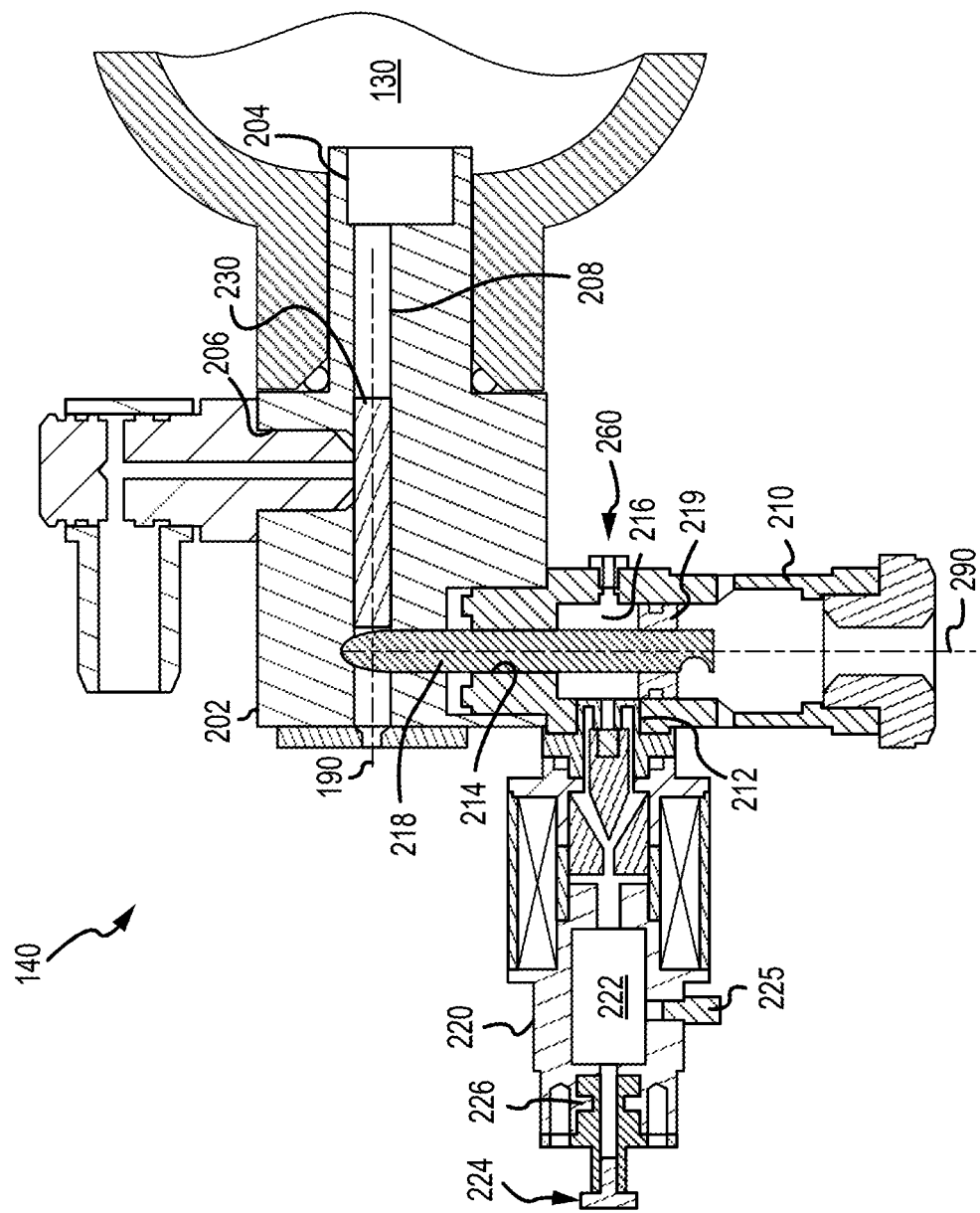
FIG. 3A and FIG. 3B illustrate section views of a pressurized fluid source valve assembly in a closed position and an open position, respectively, in accordance with various embodiments.
Figure 3B:
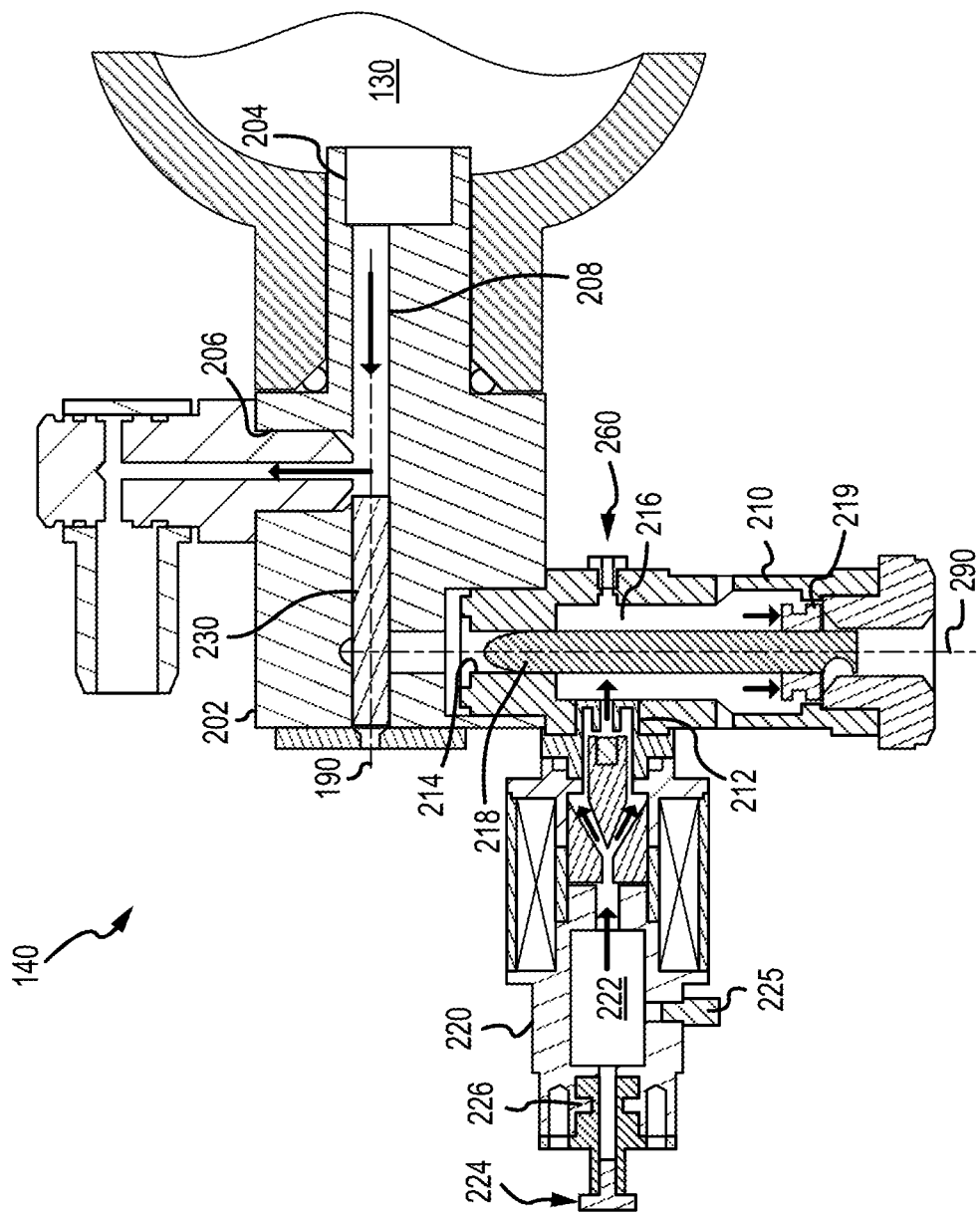

With reference to FIG. 3A and FIG. 3B, additional details of valve assembly 140 in a closed position and an open position, respectively, are illustrated. In accordance with various embodiments, valve assembly 140 includes a valve body 202 (also referred to herein as a pneumatic valve body). Valve body 202 may be made from a metal or metal alloy. In various embodiments, valve body 202 comprises an elongate geometry extending along longitudinal axis 190. Valve body 202 may define a valve inlet 204 and a valve outlet 206 of valve assembly 140. Valve body 202 may further define a main fluid channel 208 through valve body 202. Main fluid channel 208 may be coaxial with longitudinal axis 190. Main fluid channel 208 may be fluidly connected with valve inlet 204 and valve outlet 206. Valve assembly 140 receives fluid from pressurized fluid source 130 through valve inlet 204.

A spool 230 is located in main fluid channel 208. Spool 230 may comprise a rod or the like. In the closed position, spool 230 blocks, seals, or otherwise prevents, the flow of pressurized fluid from pressurized fluid source 130 to valve outlet 206.

In accordance with various embodiments, valve assembly 140 further includes an actuation cavity housing 210 coupled to the valve body 202. Actuation cavity housing 210 may be made from a metal or metal alloy. Actuation cavity housing 210 defines an inlet 212, a piston aperture 214, and an actuation cavity 216. Actuation cavity housing 210 may comprise an elongate geometry extending along a longitudinal axis 290. Actuation cavity 216 may be coaxial with longitudinal axis 290. Longitudinal axis 290 may be oriented at a non-parallel angle with respect to longitudinal axis 190. Longitudinal axis 290 may be orthogonal to longitudinal axis 190.

In various embodiments, a piston rod 218 is located at least partially within the actuation cavity 216. The piston rod 218 may be configured to extend from the actuation cavity housing 210 at least partially into the main fluid channel 208 to secure the spool 230 in a first position whereby the spool 230 fluidly seals the inlet 204 of the valve body 202 from the outlet 206 of the valve body 202. Piston rod 218 may comprise a piston head 219 at least partially defining the actuation cavity 216. Piston head 219 may seal against the inner surface of the actuation cavity housing 210 (i.e., the surface defining the actuation cavity 216).

In accordance with various embodiments, valve assembly 140 further includes a pressure cartridge 220 (also referred to herein as a solenoid operated pressure cartridge) coupled to the actuation cavity housing 210. Pressure cartridge 220 may be configured to route a pressurized fluid into the actuation cavity 216 of actuation cavity housing 210 via inlet 212 to open the valve assembly 140 (i.e., to place inlet 204 in fluid communication with outlet 206 whereby pressurized fluid from pressurized fluid source 130 exits the valve assembly 140), as described herein.

Other components of pressurized fluid source 130 may also be coupled to valve body 202. For example, in various embodiments, a pressure gauge, configured to measure a pressure of pressurized fluid source 130, may be operatively coupled to pressurized fluid source 130 via valve assembly 140.

In the closed position, an inflation fluid pressure from pressurized fluid source 130 may bias the spool 230 in a first direction (i.e., to the left in FIG. 3A) toward piston rod 218 to secure spool 230 in the closed position. In the closed position, spool 230 may abut piston rod 218. In the closed position, spool 230 may directly contact piston rod 218. In this manner, piston rod 218 generates an interference with spool 230 that blocks spool 230 from translating in the first direction (i.e., to the left in FIG. 3A) along longitudinal axis 190—i.e., that blocks spool 230 from translating to an open position.

In response to an inflation procedure being initiated, pressure cartridge 220 may be energized to open the valve assembly 140. With particular focus on FIG. 3B, in response to the pressure cartridge 220 being energized, the pressure cartridge 220 is configured to release an actuation fluid pressure—represented by arrows in FIG. 3B—into the actuation cavity 216 to bias the piston rod 218 to exit the main fluid channel 208 (e.g., by retracting at least partially into the actuation cavity 216), thereby releasing the spool 230 from the first position (see FIG. 3A) to a second position (see FIG. 3B) whereby the inlet 204 of the valve body 202 is in fluid communication with the outlet 206 of the valve body 202. In this manner, fluid pressure released into actuation cavity 216 from pressure cartridge 220 may act upon the piston head 219 and drive (i.e., move) the piston head 219 and piston rod 218 along longitudinal axis 290 with respect to actuation cavity housing 210 to retract piston rod 218 at least partially into the actuation cavity housing 210. With piston rod 218 removed from main fluid channel 208, the spool 230 is free to translate to the second position as the pressurized fluid from pressurized fluid source 130 biases spool 230 along the longitudinal axis 190. The spool 230 may be moved passed the outlet 206 thereby unsealing the inlet 204 from the outlet 206 whereby pressurized fluid—represented by arrows in FIG. 3B—may flow from the pressurized fluid source 130, through the main fluid channel 208, and exit the valve body 202 via the outlet 206 to inflate an inflatable device as desired.

Pressure cartridge 220 comprises a self-contained pressure cavity 222 containing the actuation fluid pressure (i.e., a pressurized fluid such as a gas; also referred to herein as an actuation gas). Pressure cartridge 220 includes a fill valve 224 disposed at the inlet 226 of the pressure cartridge 220 whereby the pressure cavity 222 is configured to receive a pressurized fluid from an external fluid source (e.g., a pump, a pressurized gas bottle, etc.). Fill valve 224 may comprise a Schrader valve, a Presta valve, or any other suitable gas valve. Pressure cartridge 220 may further include a pressure sensor 225 in fluid communication with the pressure cavity 222 for monitoring a pressure within the pressure cavity 222. Pressure sensor 225 may be a miniature MEMS (microelectromechanical systems) pressure sensor.

Figure 4A:
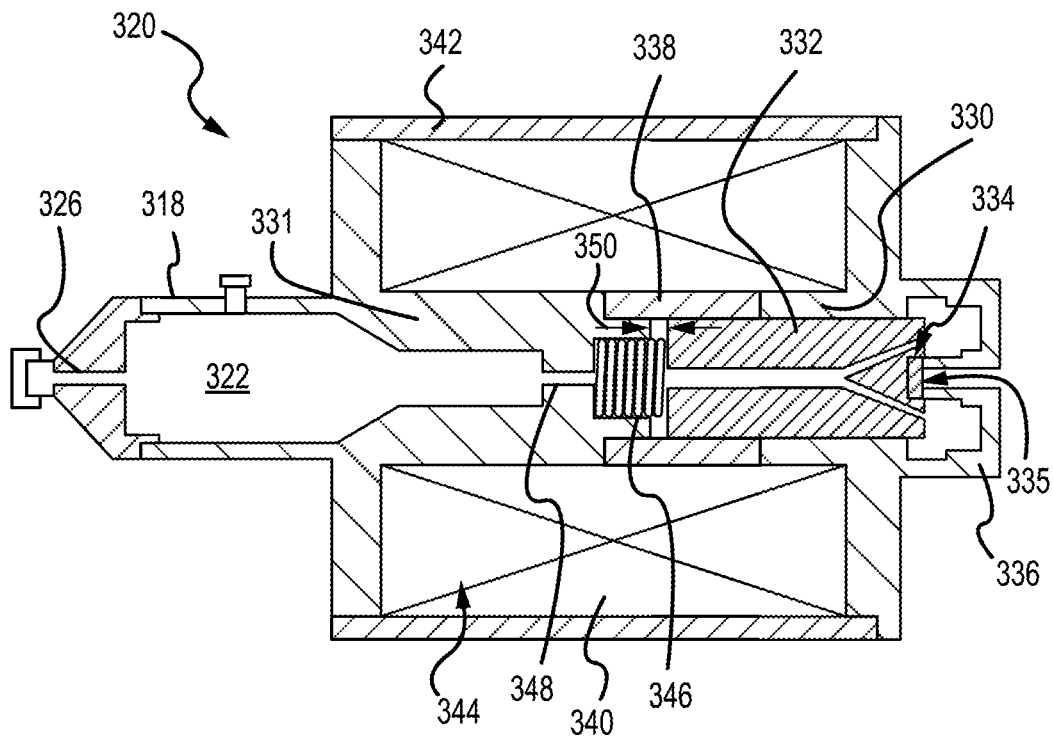
FIG. 4A and FIG. 4B illustrate section views of a solenoid actuated pressure cartridge in a closed position and an open position, respectively, in accordance with various embodiments.
Figure 4B:
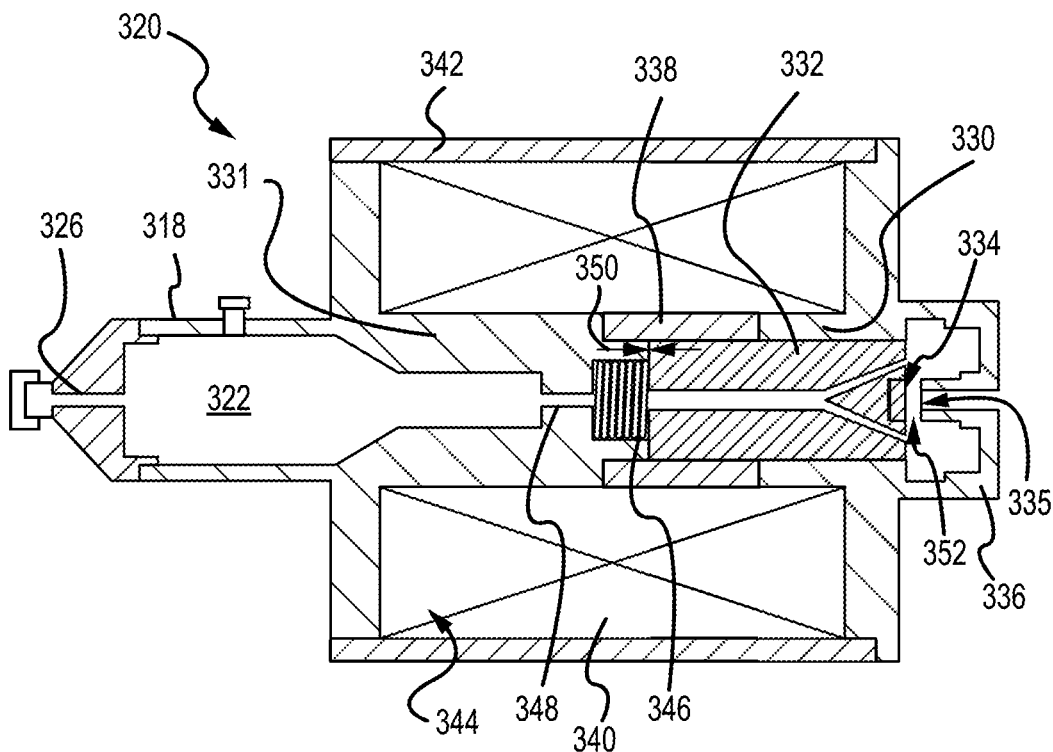

With reference to FIG. 4A and FIG. 4B, additional details of a pressure cartridge 320 are illustrated, in accordance with various embodiments. In various embodiments, pressure cartridge 220 of FIG. 3A through FIG. 3B is similar to pressure cartridge 320. In FIG. 4A, pressure cartridge 320 is in the closed position. Pressure cartridge 220 includes a pressure cartridge body 318 defining pressure cavity 322 and inlet 326. Pressure cartridge 220 includes a bobbin 331, a core portion 330, and a plunger 332. Plunger 332 may comprise a seal 334 configured to move therewith. The seal 334 may engage a valve seat 335 of a valve seal fluid fitting 336. The bobbin 331 may engage a core fitting 338. Core fitting 338 is formed of a non-magnetic material. Bobbin 331, core portion 330, and plunger 332 are made of a magnetic material, such as a ferrous metal.

In accordance with various embodiments, one or more solenoid coils 340 are wrapped helically around bobbin 331 and core fitting 338. If more than one solenoid coil is used, an insulating layer (e.g., one or more layers of epoxy or phenolic based resin, polyimide, lead(II) oxide (PbO), silicon dioxide ($SiO_2$), silicon nitride ($Si_3N_4$), silicon oxynitride (SiON), tantalum pentoxide ($Ta_2O_5$), aluminum oxide ($Al_2O_3$), or other material having similar electrically insulating properties) may be formed between a first solenoid coil and a second solenoid coil. A set of lead wires (e.g., a positive lead wire and a ground lead wire) may be electrically coupled to the (or each) solenoid coil 340. The one or more solenoid coils 340 are arranged such that, in response to receiving a constant voltage from a power source, a magnetic flux is generated by the solenoid coil 340.

A cover 342 may be located around the one or more solenoid coils 340. Cover 342 may be coupled, via adhesive, welding, fasteners, or any other suitable attachment to core portion 330 and/or to bobbin 331. Cover 342 may define a lead wire opening through which the one or more sets of lead wires are located. Cover 342, core portion 330, bobbin 331, and core fitting 338 define a cavity 344 in which the one or more solenoid coils 340 are located.

Plunger 332 is configured such that plunger 332 will translate in the magnetic flux direction generated by solenoid coil(s) 340. In this regard, the magnetic field generated by solenoid coil(s) 340 forces plunger 332 away from fluid fitting 336. Valve seal 334 is coupled to plunger 332 such that valve seal 334 translates with plunger 332 relative to fluid fitting 336. Plunger 332 is biased toward fluid fitting 336. In various embodiments, a spring 346 may bias plunger 332 toward fluid fitting 336. Spring 346 may be a coil spring. Spring 346 may be located between a flange 348 of bobbin 331 and plunger 332. Flange 348 may define an airway or channel configured to route pressurized fluid from pressure cavity 322 toward fluid fitting 336.

In the closed position, the biasing load applied by spring 346 to plunger 332 creates a gap 350 between plunger 332 and bobbin 331. In the closed position, the biasing load applied by coil spring 346 to plunger 332, in addition to the unbalanced fluid pressure from pressure cavity 322, maintains a fluid tight seal between fluid fitting 336 and valve seal 334.

Referring now to FIG. 4B, pressure cartridge 320 is illustrated in the open position. In response to receiving an electrical current (i.e., being energized), solenoid coil(s) 340 generate a magnetic field. In various embodiments, current begins to flow to solenoid coil(s) 340 in response to activation of a power source. The power source may be activated in response to deployment of evacuation assembly 106 (FIG. 1). For example, opening exit door 104 (FIG. 1) may activate said power source and/or close a circuit to electrically couple said power source to solenoid coil(s) 340, and/or otherwise cause current to flow from said power source to solenoid coil(s) 340. The electromagnetic force due to the magnetic flux value, or ampere-turns, generated by solenoid coil(s) 340 is greater than the biasing load applied by spring 346. The electromagnetic force being greater than the biasing load applied by spring 346 and the unbalanced fluid pressure force from pressure cavity 322 acting on plunger 332, causes plunger 332 and valve seal 334 to translate away from fluid fitting 336, thereby creating a gap 352 between valve seal 334 and fluid fitting 336.

With combined reference to FIG. 3B and FIG. 4B, the gap 352 between valve seal 334 and fluid fitting 336 fluidly connects pressure cavity 322 and actuation cavity 216 of actuation cavity housing 210. The pressure force of the fluid pressure entering actuation cavity 216 biased the piston head 219 to translate along longitudinal axis 290, thereby retracting piston rod 218 into actuation cavity housing 210.

Figure 5A:
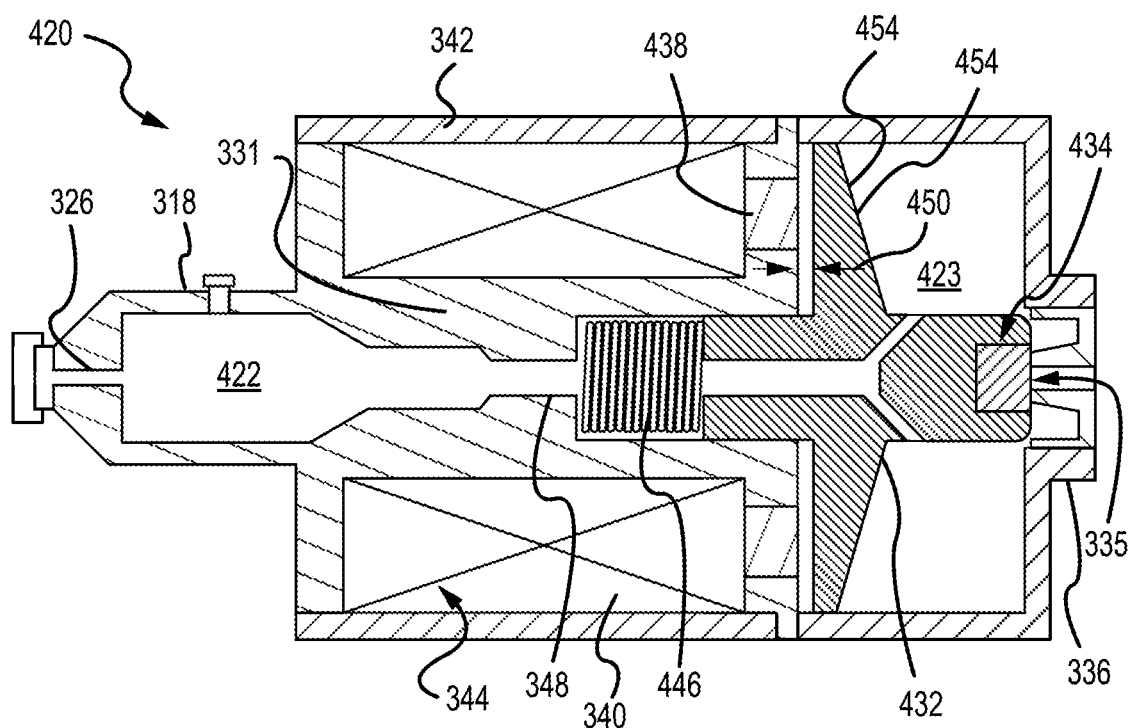
FIG. 5A and FIG. 5B illustrate section views of a solenoid actuated pressure cartridge in a closed position and an open position, respectively, in accordance with various embodiments.
Figure 5B:
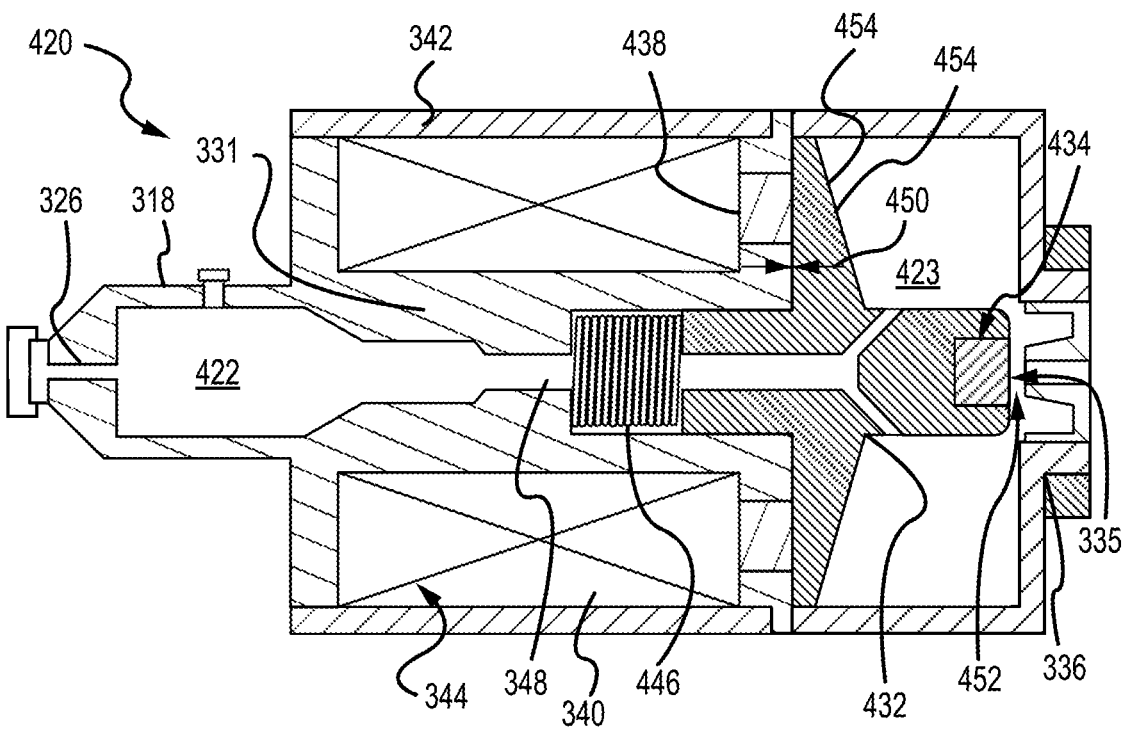

With respect to FIG. 5A and FIG. 5B, elements with like element numbering, as depicted in FIG. 4A and FIG. 4B, are intended to be the same and will not necessarily be repeated for the sake of clarity.

With reference to FIG. 5A and FIG. 5B, additional details of a pressure cartridge 420 are illustrated, in accordance with various embodiments. In various embodiments, pressure cartridge 220 of FIG. 3A through FIG. 3B is similar to pressure cartridge 420. In various embodiments, pressure cartridge 420 is similar to pressure cartridge 320 of FIG. 3A and FIG. 3B, except that plunger 432 of pressure cartridge 420 further comprises a flange 454 extending outward therefrom and longitudinally aligned between core fitting 438 and a second pressure cavity 423. The flange 454 is located longitudinally between the first pressure cavity 422 and the second pressure cavity 423 in various embodiments.

In the closed position, the biasing load applied by spring 446 to plunger 432 creates a gap 450 between plunger 432 and bobbin 431. In the closed position, the biasing load applied by coil spring 446 to plunger 432 and the unbalanced fluid pressure force from pressure cavity 422 acting on plunger 432 maintains a fluid tight seal between fluid fitting 436 and valve seal 334. The biasing load applied by coil spring 446 to plunger 432 is greater than the fluid pressure force in the second pressure cavity 423 applied to the flange 454.

The electromagnetic force generated by solenoid coil(s) 340 may be greater than the sum of the biasing load applied by spring 346 and the unbalanced fluid pressure force from pressure cavity 422 acting on plunger 432 (both of which may constitute the closing force). In addition to the electromagnetic force generated by solenoid coil(s) 340, fluid pressure force generated by the pressurized fluid in second pressure cavity 423 may bias the plunger 432, against the bias of spring 446, toward the bobbin 331. In this manner, the electromagnetic force and the fluid pressure force may overcome the biasing load applied by spring 446, causing plunger 432 and valve seal 434 to translate away from fluid fitting 336, thereby creating a gap 452 between valve seal 434 and fluid fitting 336. In various embodiments, the series arrangement of the air gap 450, flange 450, and second pressure cavity 423 may cause the pressure cartridge to actuate more quickly than if these components were not arranged as described.

With momentary reference to FIG. 3A, actuation cavity housing 210 may further include a vent 260 configured to allow pressurized fluid to escape actuation cavity 216 as a result of an over-pressure event. Vent 260 may reduce or eliminate an undesired pressure rise in the actuation cavity 216 due to leakage through the pressure cartridge 220. In various embodiments, this pressure rise inside the actuation cavity 216 can be avoided by the continuous venting of the leaked gas to an ambient environment through vent 260. This leak venting to an ambient environment will not adversely affect the functioning of actuation cavity housing 210. This vent 260 may prevent the ingress of water or other moisture and/or solid external contaminants from the external ambient environment.

Figure 6A:
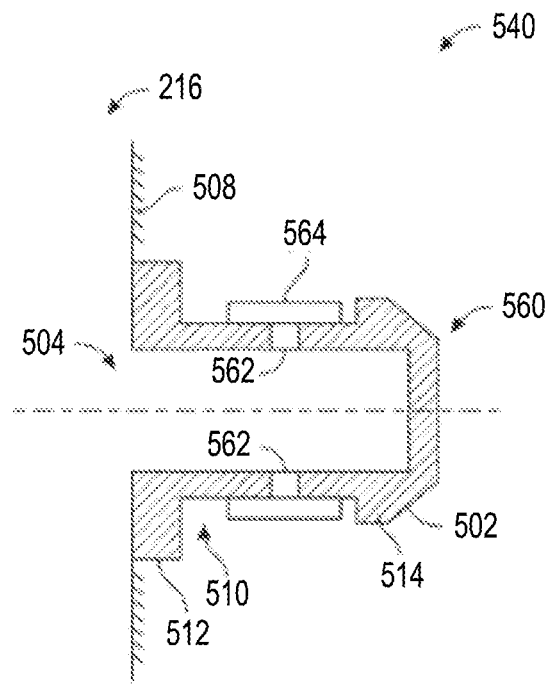
FIG. 6A and FIG. 6B illustrate a section view of a leak vent on an actuation cavity housing, with the leak vent in a closed state and an open state, respectively, in accordance with various embodiments.
Figure 6B:
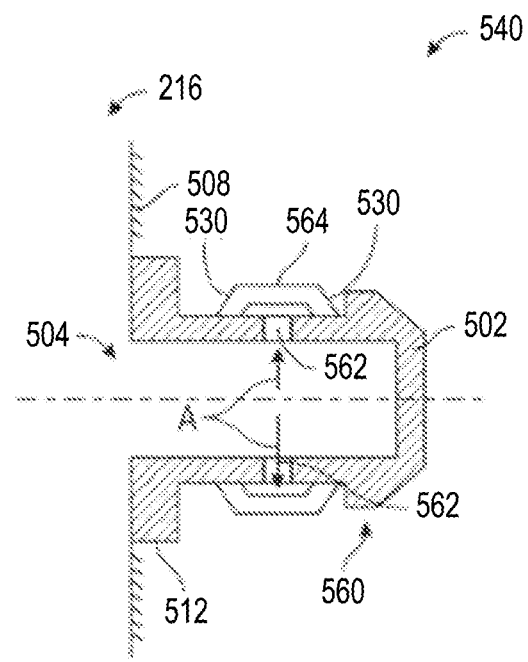

With reference to FIG. 6A and FIG. 6B, details of a vent 560 are illustrated, in accordance with various embodiments. In various embodiments, vent 240 of FIG. 3A is similar to vent 560. As best seen in FIG. 6A and FIG. 6B, the vent 560 can be implemented as an elastomeric check valve that includes a vent port 562 that is covered by an elastomeric sleeve 564. The vent 560 can be fitted to a prior actuation cavity housing 210 (see FIG. 3A) such that it is in fluid communication with the actuation cavity 216.

When the vent 560 is connected to or formed on an outer body 508 (e.g., of actuation cavity housing 210; see FIG. 3A) such that it extends outwardly therefrom and is fluidly connected to the actuation cavity 216. The vent 560 includes a vent body 502 that defines a vent volume 504 within it. In normal operation, gas leaked into the actuation cavity 216 will be able to enter the vent volume 504. The vent body 502 includes one or more vent ports 562 passing it. An elastomeric sleeve 564 surrounds the vent body 502 such that it covers or is in close proximity to the vent ports 562. When the pressure is below a threshold the elastomeric sleeve 564 is compressed on the vent body 502 such that gas in the vent volume 504 cannot exit the vent 560 as shown in FIG. 6A. When the pressure is above the threshold the elastomeric sleeve 564 is expanded away from the vent body 502 near the vent ports 562 such that gas in the vent volume 504 can exit the vent 560 as indicated by arrows A shown in FIG. 6B.

The vent body 502 can be formed of metal and can be tubular in shape. The vent ports 562 include two radial opposed ports as illustrated in FIG. 5A and FIG. 5B in an embodiment. The vent body 502 can include retaining channel 510 defined between a base 512 and an end portion 514 of the vent body 502. The outer diameter of the retaining channel 510 is smaller than the outer diameter of the end portion 514 in various embodiments. To assemble the vent 560, the elastomeric sleeve 564 is stretched slightly so that it can be passed over the end portion 514 and located in the retaining channel 510.

After installation, the elastomeric sleeve 564 is retained in the retaining channel 510. The inner diameter of the retaining sleeve 564 in its "un-stretched" or "natural" state is smaller than the outer diameter of the retaining channel 510 in various embodiment. The elastomeric sleeve 564 being stretched provides the sealing force to make the vent ports 562 leak tight to isolate the vent volume 504 from the surrounding ambient environment 540. As such, the elastomeric sleeve 564 can serve to keep water or other contaminants out of the vent volume 504.

The elastomeric sleeve 564 can be formed of materials such as nitrile or ethylene propylene diene methylene (EPDM). The material selected should be compatible to the type of pressurized fluid in the pressure cavity 222 (see FIG. 3A) and the operating temperature range in the ambient environment 540. The material properties, elastomeric sleeve dimensions, and the initial stretch may decide the initial sealing force and should be lower than the force in the actuation cavity 216 which will cause the inflation valve to open.

In various embodiments, gas leaked from the pressure cartridge 220 (see FIG. 3A) will pass into the vent volume 504 of the vent body 502. Accumulation of this leaked gas eventually develops fluid pressure higher than in ambient environment 540. This increased pressure starts to radially push out the elastomeric sleeve 564 causing it to deflect radially as shown in FIG. 6B. This radial deflection increases with pressure build up. As shown in FIG. 6B, this increased deflection eventually develops narrow gaps 530 at the interface with vent body 502 through which gas can be discharged to the ambient environment 504.

Once pressure gets discharged, the elastomeric sleeve 564 contracts back to the configuration shown in FIG. 6A. In this manner this elastomeric sleeve 564 operates as a check valve to vent the leaked gas to ambient environment 540 and to prevent the ingress of external media.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A valve arrangement for a pressurized fluid source, the valve arrangement comprising:
    a valve body comprising a first inlet, a first outlet, and a main fluid channel extending along a longitudinal axis of the valve body;
    a spool located in the main fluid channel, the spool configured to translate along the longitudinal axis of the valve body;
    an actuation cavity housing configured to be coupled to the valve body, the actuation cavity housing comprising a second inlet, a piston aperture, and an actuation cavity;
    a piston rod located at least partially within the actuation cavity, the piston rod configured to extend from the actuation cavity housing at least partially into the main fluid channel to secure the spool in a first position whereby the spool fluidly seals the first inlet from the first outlet; and
    a solenoid operated pressure cartridge configured to be coupled to the actuation cavity housing, the solenoid operated pressure cartridge includes a pressure cartridge body defining a self-contained pressure cavity containing the actuation fluid pressure, an inlet, and an outlet, the solenoid operated pressure cartridge further comprising a fill valve disposed at the inlet of the solenoid operated pressure cartridge whereby the self-contained pressure cavity is configured to receive a pressurized fluid from an external fluid source, wherein, in response to the solenoid operated pressure cartridge being energized, the solenoid operated pressure cartridge is configured to release the actuation fluid pressure into the actuation cavity to bias the piston rod to exit the main fluid channel, thereby releasing the spool from the first position to a second position whereby the first inlet is in fluid communication with the first outlet.

2. The valve arrangement of claim 1, wherein, in the first position, an inflation fluid pressure from the first inlet biases the spool to abut the piston rod.

3. The valve arrangement of claim 1, wherein the piston rod is configured to translate along a longitudinal axis of the actuation cavity housing, wherein the longitudinal axis of the valve body is oriented at a non-parallel angle with respect to the longitudinal axis of the actuation cavity housing.

4. The valve arrangement of claim 1, wherein the solenoid operated pressure cartridge further comprises:
    a valve seat disposed at the outlet;
    a plunger fluidly communicative with the pressure cavity and initially in a closed position relative to the valve seat; and
    an electromagnet configured to generate a magnetic flux to move the plunger into an open position relative to the valve seat.

5. The valve arrangement of claim 4, wherein the solenoid operated pressure cartridge further comprises a spring configured to bias the plunger toward the closed position.

6. The valve arrangement of claim 4, wherein the solenoid operated pressure cartridge further comprises a pressure sensor in fluid communication with the pressure cavity.

7. The valve arrangement of claim 1, wherein the solenoid operated pressure cartridge further comprises a fill valve whereby the pressure cavity is configured to receive a pressurized fluid from an external fluid source.

8. The valve arrangement of claim 1, wherein the piston rod comprises a piston head attached thereto, the piston head disposed in the actuation cavity.

9. The valve arrangement of claim 1, further comprising a vent fluidly connected to the actuation cavity housing, the vent including a vent body having one or more vent holes formed therein and an elastomeric sleeve surrounding a portion of the vent body and covering the one or more vent holes.

10. The valve arrangement of claim 1, wherein the solenoid operated pressure cartridge is configured to release the actuation fluid pressure into the actuation cavity to bias the piston rod to exit the main fluid channel without receiving additional fluid pressure from any fluid source other than the solenoid operated pressure cartridge.

11. A solenoid operated pressure cartridge, comprising:
    a pressure cartridge body defining a self-contained pressure cavity, an inlet, and an outlet;

a fill valve disposed at the inlet whereby the self-contained pressure cavity is configured to receive a pressurized fluid from an external fluid source to provide a self-contained source of actuation gas;

a valve seat disposed at the outlet;

a plunger fluidly communicative with the pressure cavity and initially in a closed position relative to the valve seat; and an electromagnet configured to generate a magnetic flux to move the plunger into an open position relative to the valve seat;

wherein, in response to the plunger moving into the open position relative to the valve seat, the solenoid operated pressure cartridge is configured to release the pressurized fluid from the pressure cavity, and the fill valve is configured to be closed when the plunger moves to the open position so as to not receive any additional pressurized fluid while the pressurized fluid is released from the pressure cavity.

12. The solenoid operated pressure cartridge of claim 11, wherein the plunger comprises a flange extending outwardly therefrom.

13. The solenoid operated pressure cartridge of claim 12, further comprising a second pressure cavity;

wherein the flange is longitudinally aligned between the electromagnet and the second pressure cavity.

14. The solenoid operated pressure cartridge of claim 12, further comprising an air gap located longitudinally between the flange and the electromagnet.

15. The solenoid operated pressure cartridge of claim 11, further comprising a spring configured to bias the plunger toward the closed position.

16. The solenoid operated pressure cartridge of claim 12, wherein the flange is located longitudinally between the pressure cavity and a second pressure cavity.

17. An inflation valve arrangement for inflating an inflatable device, the inflation valve arrangement comprising:

a pneumatic valve body comprising a main fluid channel having a valve body inlet connected to a source of inflation gas and valve body outlet connected to the inflatable device;

a spool located in the main fluid channel, the spool configured to translate along a longitudinal axis of the pneumatic valve body;

an actuation cavity housing connected to the pneumatic valve body, the actuation cavity housing comprising an actuation cavity;

a piston rod extending from the actuation cavity at least partially into the main fluid channel in an initially extended position;

a solenoid actuated pressure cartridge connected to the actuation cavity housing, the solenoid actuated pressure cartridge comprising:

a pressure cartridge body defining a self-contained pressure cavity containing an actuation gas, an inlet, and an outlet;

a fill valve disposed at the inlet of the solenoid operated pressure cartridge whereby the self-contained pressure cavity is configured to receive a pressurized fluid from an external fluid source;

a valve seat disposed at the outlet;

a plunger fluidly communicative with the pressure cavity and initially in a closed position relative to the valve seat; and an electromagnet configured to generate a magnetic flux to move the plunger into an open position relative to the valve seat;

wherein, in response to the plunger moving into the open position relative to the valve seat, the solenoid operated pressure cartridge is configured to release the actuation gas from the pressure cavity into the actuation cavity.

18. The inflation valve arrangement of claim 17, wherein, in response to the actuation cavity receiving the actuation gas, the piston rod is configured to move from the initially extended position to a retracted position.

19. The inflation valve arrangement of claim 18, wherein, in response to the piston rod moving from the initially extended position to the retracted position, the inflation gas is configured to move the spool from a first position, whereby the spool fluidly seals the valve body inlet from the valve body outlet, to a second position, whereby the valve body inlet is fluidly coupled to the valve body outlet, thereby releasing the inflation gas into the inflatable device.

20. The inflation valve arrangement of claim 17, wherein the solenoid actuated pressure cartridge further comprises a second inlet and a fill valve disposed at the second inlet whereby the pressure cavity is configured to be pressurized with the actuation gas prior to the plunger moving into the open position.

* * * * *